(12) United States Patent
Sato

(10) Patent No.: US 6,445,691 B2
(45) Date of Patent: *Sep. 3, 2002

(54) WIRELESS COUPLING OF STANDARDIZED NETWORKS AND NON-STANDARDIZED NODES

(75) Inventor: Takashi Sato, Scarborough, NY (US)

(73) Assignee: Koninklijke Philips Electronics N. V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

(21) Appl. No.: 09/093,213

(22) Filed: Jun. 8, 1998

(51) Int. Cl.[7] .............................. H04L 12/28; H04Q 7/24
(52) U.S. Cl. ........................ 370/338; 370/401; 370/409; 370/465; 709/230; 709/249
(58) Field of Search ................................. 370/328, 329, 370/338, 389, 396, 397, 400, 401, 409, 465, 466, 467, 395.1; 709/201, 220, 227, 230, 238, 249

(56) References Cited

U.S. PATENT DOCUMENTS

| 5,159,592 A | * | 10/1992 | Perkins ..................... 370/85.7 |
| 5,309,437 A | * | 5/1994 | Perlman et al. ........... 370/85.13 |
| 5,394,402 A | * | 2/1995 | Ross .......................... 370/94.1 |
| 5,481,535 A |   | 1/1996 | Hershey ....................... 370/60 |
| 5,572,528 A | * | 11/1996 | Shuen ...................... 370/85.13 |
| 5,734,824 A | * | 3/1998 | Choi ....................... 395/200.11 |
| 5,878,232 A | * | 3/1999 | Marimuthu ............ 395/200.79 |
| 6,016,318 A | * | 1/2000 | Tomoike ..................... 370/401 |

FOREIGN PATENT DOCUMENTS

| JP | 637763 A | 2/1994 | .......... H04L/12/28 |
| WO | WO8807794 | 10/1988 | .......... H04L/11/16 |
| WO | WO9307691 | 4/1993 | ............. H04J/3/16 |
| WO | WO9512942 | 5/1995 | .......... H04L/12/44 |
| WO | WO9729605 | 8/1997 | ............ H04Q/7/24 |

* cited by examiner

Primary Examiner—Alpus H. Hsu

(57) ABSTRACT

A method and apparatus are provided for establishing wireless communications between multiple standardized information networks and non-standardized information devices. Communicating networks may operate in accordance with the same or different standards. For each network, virtual proxy nodes are formed which represent each of the other communicating networks and each of the non-standardized information devices.

16 Claims, 2 Drawing Sheets

WIRELESS COUPLING OF STANDARDIZED NETWORKS AND NON-STANDARDIZED NODES

BACKGROUND OF THE INVENTION

1. Field of the Invention

The invention relates to wireless coupling in information systems and, in particular, to wireless coupling of standardized information devices to both standardized and non-standardized information devices.

2. Description of Related Art

Wireless coupling of information devices has been described in a number of publications. For example, published PCT Application Number WO 97/29605 describes a wireless virtual Local Area Network (LAN) which enables workgroup membership to be redefined without physical wiring changes. This is particularly useful, for example, to facilitate communication between remotely-located LANs and to permit ad hoc networking between a group of portable computers.

Such known wireless coupling arrangements are very useful, but they are limited to the coupling of standardized information devices, i.e. information devices that are adapted to communicate with each other in accordance with a common standard. A typical example is a network of computers that are adapted for communication over a common information bus. There are also, however, many other applications where it is desirable to establish wireless communications between standardized information devices and non-standardized information devices, i.e. information devices that are not adapted to communicate in accordance with a common standard. Non-standardized information devices include both standard-capable information devices, such as computers that have not been adapted to communicate in accordance with commonly-used standard, and standard-incapable information devices which do not have sufficient intelligence to be so adapted. Examples of typical standard-incapable information devices with which wireless communications are of particular interest are security apparatus, audio and video equipment telephone equipment etc. Although it is possible to provide each non-standardized information device in a system with sufficient hardware to enable it to communicate in accordance with a common standard, this is an expensive and often impractical solution. It would require substantial modification of every non-standardized information device in the system.

U.S. patent application Ser. No. 09/093,212, filed concurrently with the present application, which is hereby incorporated by reference, discloses a method and application for wireless coupling of standardized nodes and non-standardized nodes. It is also desirable, however, to effect wireless coupling of standardized networks to combinations of non-standardized nodes and other standardized networks.

SUMMARY OF THE INVENTION

It is an object of the invention to provide a method and apparatus for enabling economical wireless communication between standardized networks and combinations of non-standardized nodes and other standardized networks. As used herein:

"node" means any device that is capable of producing, processing or utilizing information;

"standardized node" means a node that is adapted for communicating with other nodes in accordance with a common standard;

"standardized network" means at least one standardized node coupled to a bus for communication with other standardized nodes;

"non-standardized node" means a node that is not adapted for communicating with other nodes in accordance with a common standard;

"wireless communication" means communicating information via any energy propagation mode which is feasible for the information being communicated, including, for example, radio frequency (RF), infra-red (IR), and sonic energy propagation modes.

It is another object of the invention to provide such a method and apparatus which automatically adapts to the addition and removal of both standardized and non-standardized nodes from a wireless communication system.

It is yet another object of the invention to provide such a method and apparatus which facilitates wireless coupling of standardized networks operating in accordance with different standards.

In a method in accordance with the invention, wireless communication in a system including a plurality of standardized networks and at least one non-standardized node is achieved by, for each standardized network:

establishing an associated virtual network including a respective virtual node representing each other standardized network and each non-standardized node;

communicating information between each other standardized network and the respective virtual node in a communication format/protocol compatible with the other standardized network;

communicating information between each non-standardized node and the respective virtual node in a communication format/protocol compatible with the non-standardized node;

communicating information between each virtual node and the associated standardized network in a communication format/protocol compatible with the associated standardized network.

In an apparatus in accordance with the invention, a wireless information system is formed which includes:

at least one non-standardized node having a transceiver for wireless communication;

a plurality of standardized networks, each including;
  a local bus for carrying communications between any standardized nodes that are connected to the bus;
  a local wireless station including a transceiver for wireless communication with the at least one non-standardized node;
  a local virtual network coupled to the local bus and to the local wireless station and including a controller and a memory for cooperatively:
    establishing in the memory a virtual node representing each other standardized network and each non-standardized node;
    communicating information between each other standardized network and the respective virtual node in a communication format/protocol compatible with said other standardized network;
    communicating information between each said non-standardized node and the respective virtual node in a communication format/protocol compatible with said non-standardized node;
    communicating information between each said virtual node and the local standardized network in a communication format/protocol compatible with said local standardized network.

DESCRIPTION OF THE PREFERED EMBODIMENT

Figure 1:
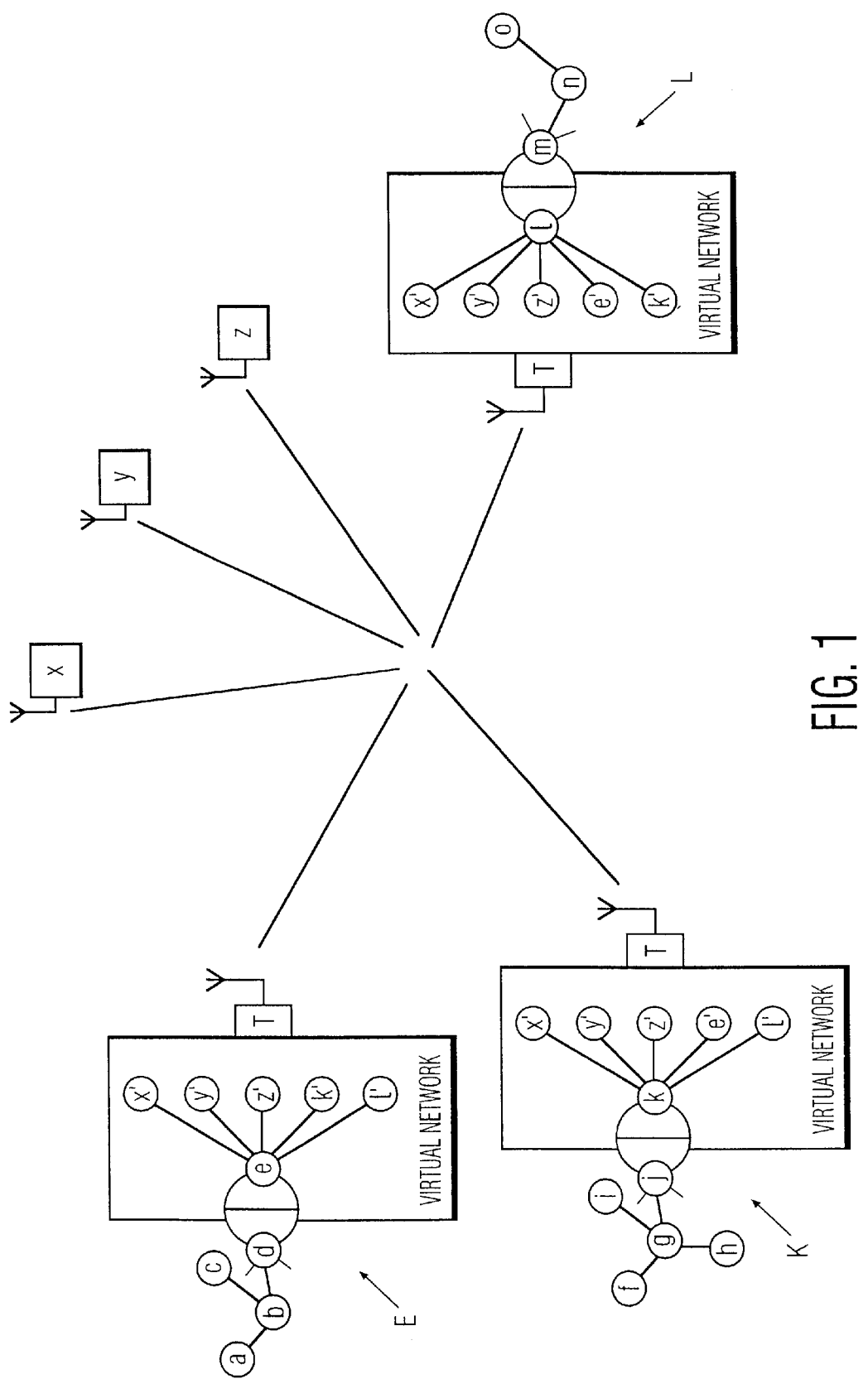
FIG. 1 is a schematic diagram illustrating an embodiment of an information system which communicates in accordance with the inventions

The information system of FIG. 1 includes a plurality of non-standardized nodes x,y,z and subsystems E,K,L, each including a real network, a virtual network and a respective wireless station. More specifically:

Subsystem E includes a real network having standardized nodes a,b,c and a real half bridge d, which is itself a standardized node; a virtual network having a virtual half bridge e and virtual proxy nodes x',y',z',k',l', and a wireless station T.

Subsystem K includes a real network having standardized nodes f,g,h,i and a real half bridge j, which is itself a standardized node; a virtual network having a virtual half bridge k and virtual proxy nodes x',y',z',e',l'; and a wireless station T.

Subsystem L includes a real network having standardized nodes n,o and a real half bridge m, which is itself a standardized node; a virtual network having a virtual half bridge 1 and virtual proxy nodes x',y',z',e',k'; and a wireless station T.

Practical information systems of this type include, for example:

an office computer system having standardized nodes including personal computers a,b,c wired for communication over a common information bus with each other and with the half bridge d;

non-standardized nodes including a printer x, a hard-disc drive y, and an image scanner z;

an entertainment and security system having standardized nodes including a digital TV f, a digital VCR g, a security camera h, and a digital stereo system I, wired for communication over a common information bus with each other and with the half bridge j; and portable computers n and o wired for communication over a common information bus with each other and with the half bridge m.

Each of the real half bridges d,j,m controllably passes information between the real network of which it is part and the respective virtual network. Depending on the design of each of these half bridges, it may also control the passage of information between the other nodes in the respective real network.

The non-standardized nodes x,y,z each include, in addition to a particular type of information device, a transceiver for wireless communication with the wireless station T. Each of these nodes also includes at least minimal intelligence for locally coordinating information flow between the respective information device and transceiver. Depending on the innate complexity of the particular information device, this minimal intelligence may take any one of a variety of forms, e.g. added logic hardware and/or software in an already-existing processor or microprocessor, a dedicated microprocessor, or dedicated logic hardware.

Each wireless station T includes a local transceiver for wireless communication with the transceivers of nodes x,y,z and a wireless link for coordinating information flow between this local transceiver and the respective local virtual network. Each wireless station and each of the non-standardized nodes x,y,z also includes a respective transducer for propagating the mode of energy chosen for wireless communication. In the exemplary embodiment shown in FIG. 1, antennas are shown for propagating RF energy.

Each virtual network is a model that is formed with reference to the respective real half bridge, the non-standardized nodes, and the virtual half bridges in the other virtual networks. Specifically:

In subsystem E, the virtual half bridge e is modeled to be complementary to the real half bridge d, such that half bridges d and e collectively form a standardized full bridge. The virtual proxy nodes x',y',z' are modeled to represent the respective non-standardized nodes x,y,z, but modified to communicate with virtual half bridge e in the same standard as the real nodes a,b,c communicate with the real half bridge d. The virtual proxy nodes k' and l' are modeled to represent the respective virtual nodes k and l, in respective subsystems K and L, and modified if necessary to communicate with virtual half bridge e. Such modification is necessary only if the real networks with which virtual nodes k and l communicate operate in accordance with a different standard than the real network of which node d is a part.

In subsystem K, the virtual half bridge k is modeled to be complementary to the real half bridge j, such that half bridges j and k collectively form a standardized full bridge. The virtual proxy nodes x',y',z' are modeled to represent the respective non-standardized nodes x,y,z, but modified to communicate with virtual half bridge k in the same standard as the real nodes f,g,h,i communicate with the real half bridge j. The virtual proxy nodes e' and l' are modeled to represent the respective virtual nodes e and l, in respective subsystems E and L, and modified if necessary to communicate with virtual half bridge k. Such modification is necessary only if the real networks with which virtual nodes e and 1 communicate operate in accordance with a different standard than the real network of which node j is a part.

In subsystem L, the virtual half bridge l is modeled to be complementary to the real half bridge m, such that half bridges m and l collectively form a standardized full bridge. The virtual proxy nodes x',y',z' are modeled to represent the respective non-standardized nodes x,y,z, but modified to communicate with virtual half bridge l in the same standard as the real nodes n,o communicate with the real half bridge m. The virtual proxy nodes e' and k' are modeled to represent the respective virtual nodes e and k, in respective subsystems E and K, and modified if necessary to communicate with virtual half bridge l. Such modification is necessary only if the real networks with which virtual nodes e and k communicate operate in accordance with a different standard than the real network of which node m is a part.

Figure 2:
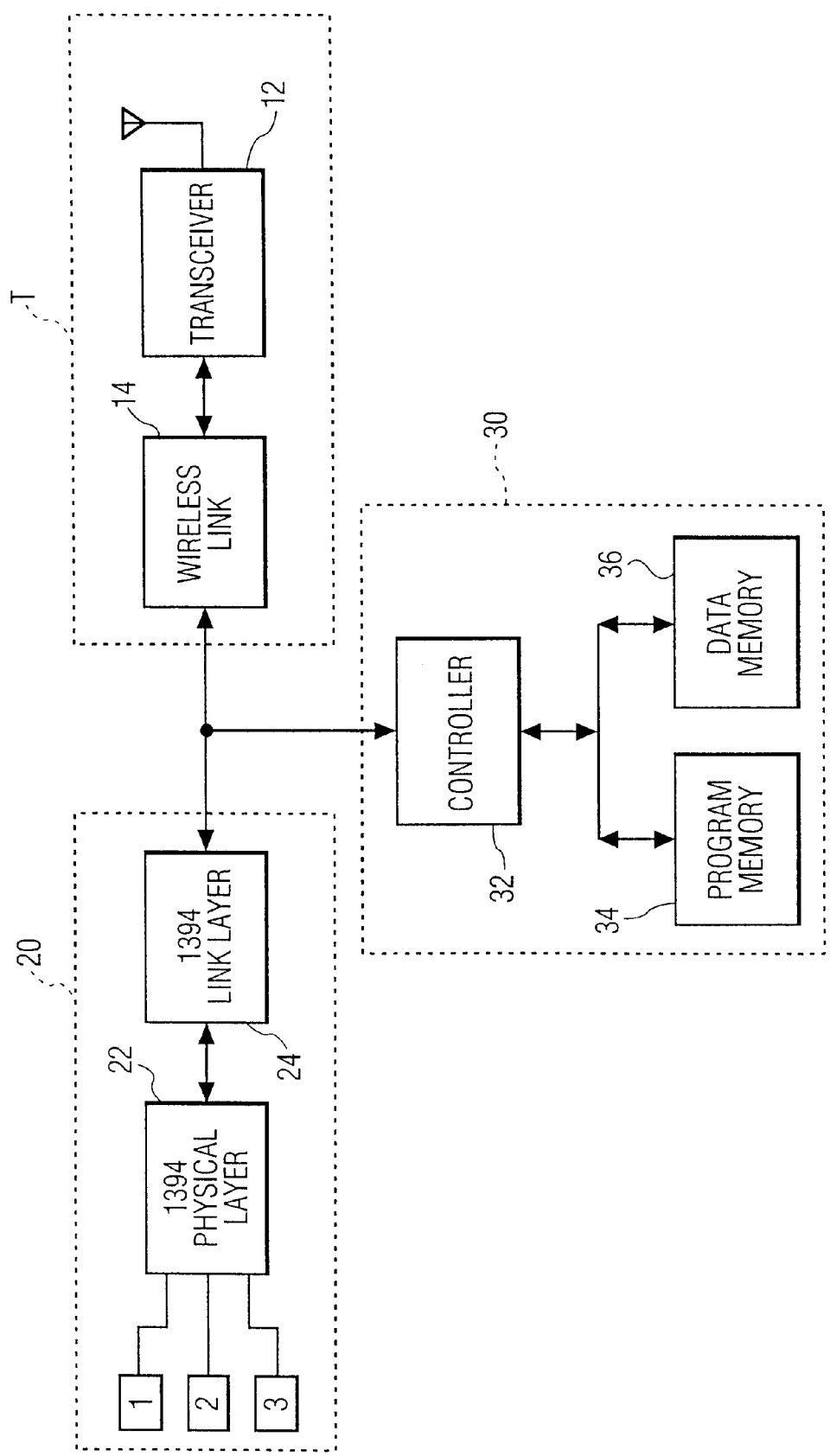
FIG. 2 is a block diagram illustrating an embodiment of a portion of the information system of FIG. 1.

FIG. 2 illustrates an exemplary embodiment of a lower-level subsystem for forming the real half bridge, the virtual network and the wireless station in each of the subsystems E,K,L. This lower-level subsystem includes a bridge-interface unit 20, a virtual intelligence unit 30, and the wireless station T mentioned in conjunction with the description of FIG. 1.

The wireless station T includes a transceiver 12 and a wireless link 14. The transceiver is a conventional device, with the type of transceiver depending on the mode of propagation chosen for wireless communication. The wireless link 14 is also a conventional device for performing the functions of:

transferring to the virtual intelligence unit 30 signals received by the transceiver 12 from the other virtual networks in the system;

transferring to the transceiver 12 signals received from the virtual intelligence unit 30 for transmission to the other virtual networks in the system;

converting signals received from the non-standardized nodes x,y,z, via the transceiver 12, to a format compatible with the virtual intelligence unit 30;

converting signals received from the virtual intelligence unit to a format compatible with the transceiver and the non-standardized nodes; and exchanging timing and control signals with the virtual intelligence unit to effect arbitration, i.e. to coordinate the transfer of information to and from the non-standardized nodes.

The wireless link may be implemented by using, for example, a microprocessor and software for performing the format conversions. Alternatively, if the formats chosen for communication with the non-standard nodes are not so complex as to require extensive hardware, the wireless link may be constructed by using logic circuitry. See, for example, the wireless link described in PCT Application WO 88/07794, published on Oct. 6, 1988.

The virtual intelligence unit 30 includes a controller 32, a program memory 34 and a data memory 36. The controller, which is coupled to the wireless station T and to the bridge-interface unit 20 via a bus, may be e.g. a microprocessor, a micro-controller or a digital signal processor. The controller, under the direction of instructions in the program memory, has the capability of cooperating with the wireless station T to:

detect the existence of other virtual nodes and any non-standardized nodes that are currently capable of wireless communication with the transceiver 12;

form virtual proxy nodes (e.g. the nodes x', y', z', k', l' in the virtual network of subsystem E) representing the detected nodes by storing in the data memory a description of each detected node and data which is either received from, or to be transmitted to, the node;

coordinating with the wireless station to exchange communications between the virtual proxy nodes (e.g. x',y',z',k',l') and the real and virtual nodes that they represent (x,y,z,k,l).

Note that a variety of information may be stored in the program and data memories in association with the virtual proxy nodes, including, for example:

formatting information unique to each of the non-standardized nodes represented by the proxy nodes;

formatting information for facilitating communication with any standardized nodes represented by the proxy nodes (e.g. k',l') which operate in accordance with a different standard than that of the real half bridge (e.g. d) to which the respective virtual network is connected;

algorithms for performing operations on data received from, or to be transmitted to, any of the nodes represented by the proxy nodes;

relative priorities for communications with the respective nodes represented by the proxy nodes.

Note, further, that the virtual intelligence unit is easily adapted to changes in the types of non-standardized and standardized nodes with which each virtual network is to communicate. Information, e.g. program instructions and descriptive data, needed for communicating with new types of non-standardized nodes, and with standardized nodes that operate in accordance with a different standard, can be easily added to the program and data memories of the virtual intelligence unit.

The bridge-interface unit 20 and the virtual intelligence unit 30 cooperatively form the bridge comprising the real half bridge and the virtual half bridge in each of the subsystems E,K,L. Each real half bridge (e.g. node d in subsystem E) must communicate with the respective standardized nodes to which it is connected (e.g. a,b,c) in accordance with their common standard. Each virtual half bridge (e.g. node e in subsystem E) must be capable of universally communicating with all virtual proxy nodes (e.g. x',y',z',k',l') in their respective formats. The half bridges may communicate with each other in any format common to each.

In the exemplary embodiment shown in FIG. 2, the standard chosen for all of the real networks (i.e. the networks having the nodes a,b,c,d; the nodes f,g,h,i,j; and the nodes m,n,o) is the IEEE 1394 Standard. This standard is described in detail in the publication IEEE Std 1394-1995, "IEEE Standard for a High Performance Serial Bus" (Aug. 30, 1996), which is hereby incorporated by reference. This is a particularly useful standard for high performance bus interconnection of computer peripherals and consumer electronics, including the transmission of high-speed digital video data.

In each of the subsystems (E,K,L) part of the real half bridge (d,j,m) is formed by the respective bridge-interface unit 20, which includes a 1394-Standard physical layer 22 and a 1394-Standard link layer 24. Both of these layers are functional logic elements which are described collectively in IEEE Std 1394-1995 and in the IEEE publication P1394.1 Draft 0.03, "P1394.1 Draft Standard for High Performance Serial Bus Bridges" (Oct. 18, 1997), which is hereby incorporated by reference. The physical layer 22 includes exemplary ports 1,2,3 for physical connection to a common bus on which 1394-Standard nodes, e.g. the nodes h,p,q, communicate; ensures that only one node at a time transmits information on the common bus by providing an arbitration service; and converts communications received from the link layer 24 to the 1394 Standard. The link layer formats communications received from the physical layer into a standardized datagram which is addressed and framed for transmission to a predetermined one of the nodes currently in communication with the wireless station T and represented by the proxy nodes (e.g. x',y',z',k',l' in subsystem E).

In each of the subsystems (E,K,L) the virtual intelligence unit 30 forms the remainder of the real half bridge (d,j,m) and forms the virtual half bridge (e,k,l). More specifically, the controller 32, together with the program memory 34 and the data memory 36, forms:

a common 1394.1-Standard switching fabric (internal fabric) coupling the real and virtual half bridges (de, jk,ml); and the remainder of the virtual half bridge (e,k,l) with links to the current virtual proxy nodes in the respective virtual network.

What is claimed is:

1. A method of wireless communication is a system including a first standardized network adapted for communication in accordance with a common standard, and at least one other standardized network, wherein each of the standardized networks comprises a respective real half bridge; and at least one non-standardized node adapted for communication in a communication/protocol compatible with the respective at least one non-standardized node and not adapted for communication with other nodes in accordance with said common standard, wherein said non-standardized node lacks computing capability sufficient to communicate in accordance with said common standard, and said method comprises:

a. determining the identity of each other standardized network and of each non-standardized node and selecting a communication format/protocol compatible with each said other standardized network and the respective communication format/protocol compactible with each said non-standardized node;

b. establishing a respective virtual node representing each other standardized network and each non-standardized node;

c. in each respective network, communicating information with the standardized nodes in the respective network through the respective real half bridge;

c. communicating information between each other standardized network and the respective virtual node in the communication format/protocol compatible with said other standardized network;

d. communication information between each said non-standardized node and the respective virtual node in the respective communication format/protocol compatible with said non-standardized node; and e. communicating information between each said virtual node and the first standardized network in a communication format/protocol compatible with said first standardized network; and wherein the virtual network includes a virtual half bridge for communicating with the real half bridge and with the virtual nodes in the respective communication format/protocol compatible with the respective virtual node being communicated with.

2. A method of wireless communication in a system including a first standardized network adapted for communication in accordance with a common standard, at least one other standardized network, and at least one non-standardized node adapted for communication in a communication/protocol compatible with the respective at least one non-standardized node and not adapted for communication with other nodes in accordance with said common standard, wherein said non-standardized node lacks computing capability sufficient to communicate in accordance with said common standard, and said method comprises:

a. determining the identity of each other standardized network and of each non-standardized node and selecting a communication format/protocol compatible with each said other standardized network and the respective communication format/protocol compatible with each said non-standardized node;

b. establishing a virtual node representing each other standardized network and each non-standardized node;

c. communicating information between each other standardized network and the respective virtual node in the communication format/protocol compatible with said other standardized network;

d. communicating information between each said non-standardized node and the respective virtual node in the respective communication format/protocol compactible with said noon-standardized node; and e. communicating information between each said virtual node and the first standardized network in a communication format/protocol compatible with said first standardized network.

3. A method as in claim 2, wherein the step of communicating between each non-standardized node and the respective virtual node comprises communicating by a wireless link.

4. A wireless information system for wireless communication with at least one non-standardized node adapted for communication in a communication/protocol compatible with the respective non-standardized node and not adapted for communication with other nodes in accordance with a common standard, and having a transceiver, wherein said at least one non-standardized node lacks computing capability sufficient to communicate in accordance with said common standard;

said system including a plurality of standardized networks adapted for communication in accordance with said common standard, at least a first of said standardized networks including:

a. a local bus for carrying communications between one standardized node and any other standardized nodes that are connected to the bus;

b. a local wireless station including a transceiver for wireless communication with the at least one non-standardized node; and c. a local virtual network coupled to the local bus and to the local wireless station and including a controller and a memory for cooperatively:

i. establishing in the memory a virtual node representing each other standardizing network and each non-standardizing node;

ii. communicating information between each other standardized network and the respective virtual node in the communication format/protocol compatible with said other standardized network;

iii. communicating information between each said non-standardized node and the respective virtual node in the communication format/protocol compatible with said non-standardized node; and iv. communicating information between each said virtual node and the local standardized network in a communication format/protocol compatible with said local standardized network.

5. A system as in claim 4, wherein said real half bridge is formed by a bridge interface unit including a physical layer and a link layer.

6. A system as in claim 5, wherein said physical layer is a 1394-Standard physical layer, and said link layer is a 1394-Standard link layer.

7. A system as in claim 4, wherein said virtual half bridge is formed by a virtual intelligence unit comprising said controller, and said memory comprised a program memory and a data memory.

8. A system as claimed in claim 4, wherein said one non-standardized node is a printer which lacks computing capability to communicate according to said common standard.

9. A system as claimed in claim 4, wherein said one non-standardized node is at least one component of a residential entertainment system which lacks computing capability to communicate according to said common standard.

10. A system as claimed in claim 4, wherein said one non-standardized node is a security system which lacks computing capability to communicate according to said common standard.

11. A system as claimed in claim 4, wherein said one non-standardized node is a telephone device which lacks computing capability to communicate according to said common standard.

12. A wireless information system for wireless communication with at least one non-standardized node adapted for communication in a communication/protocol compatible with the respective non-standardized node and not adapted for communication with other nodes in accordance with a common standard, and having a transceiver, wherein said at least one non-standardized node lacks computing capability sufficient to communicate in accordance with said common standard;

said system including a plurality of standardized networks adapted for communication in accordance with said common standard, at least a first of said standardized networks including:
  a. a local bus for carrying communications between one standardized node and any other standardized nodes that are connected to the bus, wherein said standardized nodes comprises a real half bridge for communicating with other standardized nodes in the first network;
  b. a local wireless station including a transceiver for wireless communication with the at least one non-standardized node; and
  c. a local virtual network which includes a virtual half bridge for communicating with the real half bridge, and is coupled to the local bus and to the local wireless station and includes a controller and a memory for cooperatively:
    i. establishing in the memory a virtual node representing each other standardized network and each non-standardized node;
    ii. communicating information between each other standardized network and the respective virtual node in the communication format/protocol compatible with said other standardized network;
    iii. communicating information between each said non-standardized node and the respective virtual node in the communication format/protocol compatible with the respective non-standardized node; and
    iv. communicating information between each said virtual node and the local standardized network in a communication format/protocol compatible with said local standardized network.

13. A system as in claim 12, wherein said real half bridge is formed by a bridge interface unit including a physical layer and a link layer.

14. A system as in claim 13, wherein said physical layer is a 1394-Standard physical layer, and said link layer is a 1394-Standard link layer.

15. A system as in claim 12, wherein said virtual half bridge is formed by a virtual intelligence unit comprising said controller, and said memory comprises a program memory and a data memory.

16. A system as in claim 15, wherein said virtual intelligence unit forms a common 1394.1-Standard switching fabric for coupling the two half bridges.

* * * * *